April 4, 1961 D. D. WILCOX, JR 2,978,656

INTERFERENCE FILTER

Filed Jan. 26, 1954 2 Sheets-Sheet 1

Dwight D. Wilcox, Jr.
INVENTOR.

BY [signature]
[signature]
ATTORNEYS

April 4, 1961 D. D. WILCOX, JR 2,978,656

INTERFERENCE FILTER

Filed Jan. 26, 1954 2 Sheets-Sheet 2

Dwight D. Wilcox, Jr.
INVENTOR.

BY [signature]
[signature]
ATTORNEYS

United States Patent Office 2,978,656

Patented Apr. 4, 1961

2,978,656

INTERFERENCE FILTER

Dwight D. Wilcox, Jr., Rochester, N.Y., assignor, by mesne assignments, to the United States of America as represented by the Secretary of the Navy Filed Jan. 26, 1954, Ser. No. 406,380

1 Claim. (Cl. 333—75)

This invention relates to an improved interference filter for highly attenuating an undesired frequency component from a desired signal.

In certain cases, it is highly desirable to provide means for eliminating an unwanted frequency from a complex alternating current signal while passing all other frequencies with a minimum of attenuation. Many arrangements have been proposed for performing this function, but have proven to be unsatisfactory for various reasons. Thus, while many of the earlier proposed devices will give the desired high degree of attenuation of the unwanted signal, they are insufficiently "sharp" and attenuate frequencies relatively close to the unwanted frequency to an undesired extent. Moreover, the prior devices are unduly complicated and require a relatively large number of precision components to even approach the desired pass characteristics.

It is an object of this invention to provide a filter, the pass curve of which has a very sharply defined notch of high attenuation at a predetermined frequency and yet which is relatively flat on both sides of the rejection notch.

It is a further object to provide such a filter which uses a minimum of parts, most of which can be standard off-the-shelf electrical components and yet which will give the desired pass characteristics.

Further objects will appear from the following description and claim especially when considered in the light of the accompanying drawing.

Figure 1:
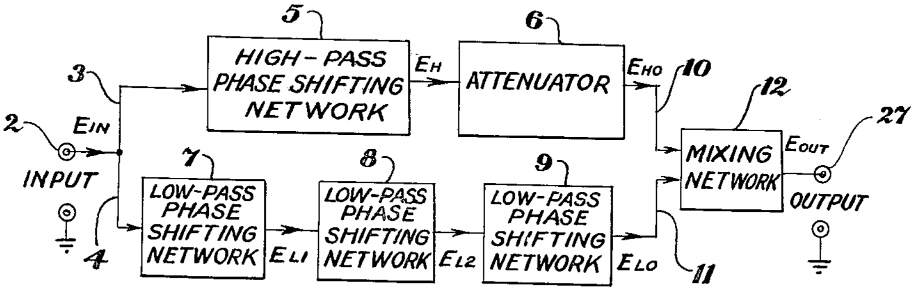
Figure 1 is a block diagram of the improved filter.

As shown in Figure 1, the improved filter is provided with a pair of input terminals 2, one of which, for convenience, is shown as being grounded. Voltage applied across the input terminals is applied as at 3 to a high-pass, phase shifting, network 5, the output of which is passed through a suitable attenuator 6. The input voltage is also applied as 4 to the input of a multi-section, low-pass, phase shifting filter made up of the three low pass networks 7, 8 and 9, connected in series with one another. The outputs from the high and low pass filters are then applied as at 10 and 11 to a suitable mixing network 12, the output of which is connected to the output terminal 31.

The high pass filter 5 is so designed as to produce a phase shift of approximately 30° in one direction at the unwanted frequency. Each of the low pass sections 7, 8 and 9 is arranged to provide a phase shift at this same frequency of approximately 50° in the opposite sense. Thus, the output of the high pass filter will, at the unwanted frequency, be substantially 180° out of phase with that at the output of the last section of the low pass filter. The attenuator 6 is so designed as to reduce the output voltage of the high pass filter so that at the unwanted frequency, the outputs of the high and low pass filters will have the same amplitude. Thus, when these two voltages are mixed together in the mixer 12, they will cancel one another completely.

Figure 2:
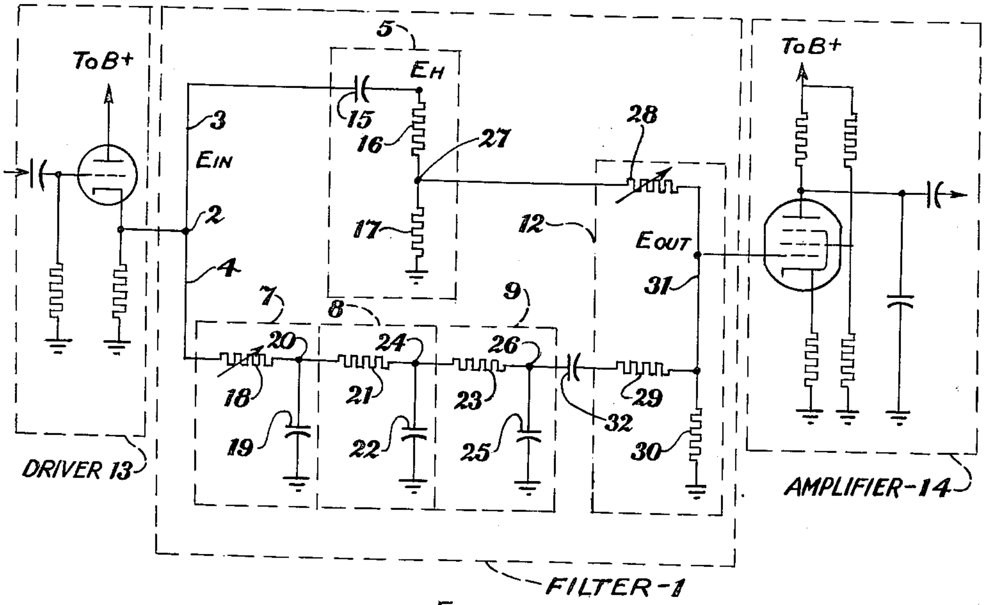
Figure 2 is a schematic circuit diagram of an actual embodiment of the filter.

Figure 2 shows such a filter network 1 which has been provided with a suitable driver 13 for passing the signals into the filter network proper and an amplifier 14 arranged to amplify the output of the filter so as to compensate for attenuation produced by the filter over the desired band of frequencies, thus bringing the desired output signals up to their original amplitude. The high pass filter 5 therein comprises a condenser 15 connected to the input terminal 1 and having its other side connected by series resistors 16 and 17 to ground. The first low pass filter section 7 comprises a resistor 18 also having one end connected to the input terminal 2, and having its other end connected through a condenser 19 to ground, the junction 20 between the condenser and resistor providing the output terminal of this section. To this junction 20 is connected the resistor 21 of the second filter section 8 which is likewise connected by means of a condenser 22 to ground. Similarly, the third section comprises a resistor 23 connected to the junction 24 of resistor 21 and condenser 22, and having its other end connected through the condenser 25 to ground. Output from the low-pass filter appears at the junction 26 of resistors 23 and 25 of section 9.

In the embodiment shown, attenuation of the output from the high-pass filter 5 is obtained by tapping down on the resistance element of this filter so as to obtain a voltage dividing action. Thus, attenuated output from this filter is obtained at the junction 27 between resistors 16 and 17, the values of these resistors being so proportioned as to provide the desired degree of attenuation.

This attenuated output from the high-pass filter and that from the low pass filter are then applied through suitable isolating resistors 28 and 29 respectively across a common mixing resistor 30 of relatively high resistance, so that the voltage at the upper end 31 of resistor 30 will, at all times, be the resultant of that applied by the high and low pass filters. A blocking condenser 32 is provided to block the flow of D.C. through the low pass filter.

Resistor 28 is shown as being variable and serves as a convenient means of obtaining a fine degree of control of the attenuation of the high-pass filter output so that exact balance can be obtained.

Figure 3:
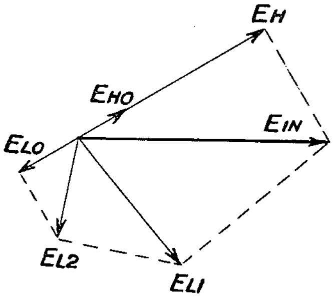
Figures 3, 4 and 5 are vector diagrams illustrating the action of the filter.

The action of this filter arrangement will be made clear from a study of Figures 3, 4 and 5. The particular filter shown in Figure 2 was designed to provide high attenuation at a frequency of 10 cycles, and Figure 3 illustrates the theoretical voltage vectors that will obtain at various points in the network. The input voltage at terminal 2 is designated as $E_{IN}$. $E_H$ indicates the voltage appearing at the top of the resistor 16 of the high pass filter, while $E_{HO}$ designates the attenuated output of the high pass filter. Similarly, $E_{L1}$, $E_{L2}$ and $E_{LO}$ designate the voltages which will appear at the output terminals of the low pass filter sections 7, 8 and 9, respectively. The resultant voltage appearing at the output terminal 31 is designated as $E_{OUT}$ and is the vector sum of $E_{HO}$ and $E_{LO}$. Figure 3 represents the relationships of these voltages at the rejection frequency which, in this case, is ten cycles. It will be noted that $E_H$ leads $E_{IN}$ by approximately 30° and that $E_{LO}$ is 180° out of phase therewith. The resultant of the attenuated output $E_{HO}$ from the high pass filter and the output $E_{LO}$ of the low pass filters is zero indicating infinite attenuation.

Figure 4:
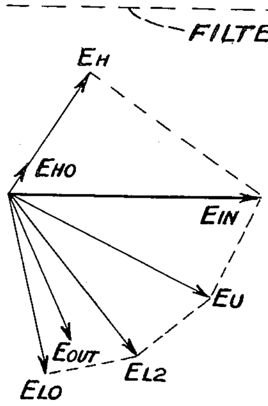

Figure 4 represents the voltages when a frequency of four cycles is applied to the input terminals. Under these conditions $E_{HO}$ and $E_{LO}$ are no longer 180° out of phase with one another and, moreover, $E_{LO}$ is appreciably greater in amplitude than $E_{HO}$, the resultant being designated by the vector $E_{OUT}$.

Figure 5:
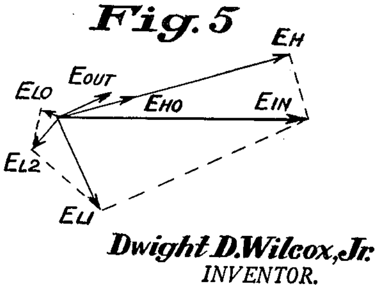

Figure 5 shows the voltage relationships when a frequency of twenty cycles is applied to the input of the filter. Note that in this case, the output from the low pass filter is very highly attenuated and the resultant output $E_{OUT}$ is primarily attributable to the voltage passing through the high pass filter. At higher frequencies $E_{LO}$ is attenuated to an even greater degree, and for all practical purposes, the output from the filter will, at such higher frequencies, be substantially that from the high pass filter alone. Moreover, since phase shift in the high pass filter at these higher frequencies is but relatively slight, the output will be substantially flat.

Figure 6:
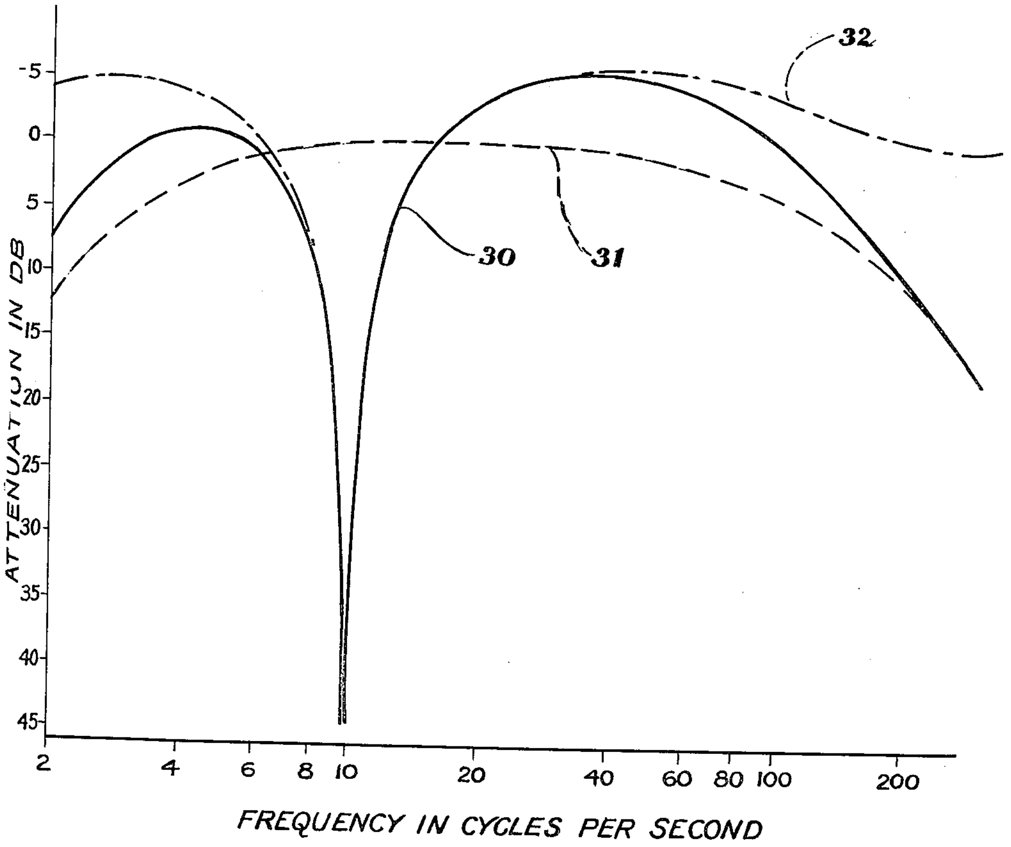
Figure 6 is a performance curve for the apparatus shown in Figure 2.

Figure 6 shows in solid lines 32, the attenuation characteristics of an amplifier (not shown), having the filter shown in Figure 2 (including its driver and amplifier stages 13 and 14) in series therewith. For comparison purposes, the attenuation characteristics of the external amplifier alone are shown in dashed lines 33. The dash-dot line 34 indicates the attenuation characteristics of the circuit shown in Figure 2, independently of the external amplifying equipment. Study of the solid line curve 32 indicates quite strikingly, the effectiveness of my filter arrangement in attenuating the unwanted frequency while passing the other frequencies.

A particular advantage of the filter system shown in Figure 2 is that it may employ almost entirely off-the-shelf components. Only resistors 18 and 28 need to be accurately adjusted to a given value; all other components may be standard 10% tolerance elements. While with such standard components the phase shift in the high pass network may depart slightly from the preferred 30° value at the design frequency, the output of the low pass network may be varied slightly in phase by adjusting resistor 18 so as to compensate for any departures from design values, so that the output of the low pass filter will be exactly 180° out of phase with that of the high pass filter at the desired frequency. Similarly, by adjusting resistor 28, the amplitude of the output of the high pass filter may be made exactly equal to that of the low pass filter at this desired frequency. While these resistors 18 and 28 have been shown as being variable, once the correct value has been determined for any particular piece of filter equipment, the corresponding fixed resistor could obviously be substituted.

Figure 7:
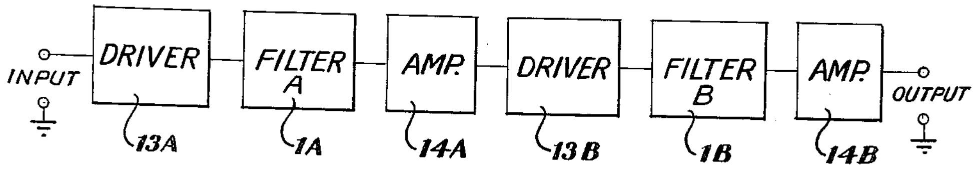
Figure 7 is a block diagram showing two such filters in series.

As is noted from Figure 6, the attenuation curve is very sharply peaked at the design frequency so that a relatively small change in frequency of the interfering source would permit a substantial voltage to pass through the filter. However, the effective width of the rejection notch can be considerably broadened by providing two such filter units (with their associated drivers and amplifiers), connected in series with one another as shown in Figure 7, with one of the filters being tuned slightly below the design frequency and the other slightly above. Thus, two such filters, adjusted respectively to 9 cycles and 10½ cycles will provide more than 35 db attenuation for frequencies between 9 and 11 cycles.

In designing a filter network in accordance with this invention, it is highly desirable that the low pass filter include at least three similar sections. If less than three are employed, the response of the network at frequencies below the rejection notch will be unduly high compared to the output at frequencies above the notch. Moreover, it is highly desirable that the phase shift through the high pass section be not appreciably greater than 30° at the rejection frequency, since higher phase shift will produce a considerable variation in output at frequencies above the rejection notch. While, as indicated above, it is preferred that no less than three sections be used in the low pass filter, slightly improved results would obtain if more sections were used. However, the improvement would be so slight as to not ordinarily justify cost of the additional components that would be required and, therefore, a three section unit is to be preferred.

While in the embodiment shown, the filters have constituted resistor-condenser networks, it is believed obvious that other types of high and low pass filters could be employed without departing from the principles disclosed herein. Moreover, this same type of arrangement could obviously be used for other frequencies, including much higher frequencies than were assumed in the instant case. Obviously, too, while the device shown was intended for use in an unbalanced transmission line, that is, where one side of the line is grounded, the same principles could be applied to a filter for use in a balanced line, and the changes required would be obvious to those skilled in the art.

Many other changes will be obvious to those skilled in the art and could be incorporated without departing from the spirit and scope of the invention as defined by the appended claim.

What I claim is:

A filter network for highly attenuating electrical energy of a predetermined frequency comprising a pair of input terminals, a high pass filter comprising a condenser and two resistors connected in series across said input terminals and providing an output at the junction of said resistors, a multi-section low pass filter comprising a plurality of low pass filter sections connected in series with one another, each of said sections comprising a resistor and a condenser connected in series with one another and providing an output at the junction thereof, the first of said sections having its resistor connected to the input terminal to which the condenser of said high pass filter is connected and its condenser connected to the other input terminal, each succeeding section being similarly connected to the output of the preceding section and to the other input terminal so that the resistors thereof are arranged in series, means for vectorially combining the outputs of said high and low pass filters and comprising a resistor of relatively high value having one end connected to said other input terminal, a connection from the output of said high pass filter to the other end of said last-mentioned resistor, and means including a condenser connecting said other end of said last-mentioned resistor to the output of said last section of said low pass filter, the value of said resistors and condensers being so proportioned that said high pass filter will produce a phase shift of substantially 30° in energy travelling therethrough at said frequency, and the voltage impressed across said mixing resistor by said low pass filter at said frequency will be substantially equal to and 180° out of phase with that impressed thereacross by said high pass filter, and the phase shifts produced in said low pass filter sections will be substantially equal to one another.

References Cited in the file of this patent

UNITED STATES PATENTS

| | | |
|---|---|---|
| 1,956,121 | Craig | Apr. 24, 1934 |
| 2,298,177 | Scott | Oct. 6, 1942 |
| 2,465,265 | Ressler | Mar. 22, 1949 |
| 2,495,511 | Dolberg | Jan. 24, 1950 |